June 29, 1965 G. H. POHM 3,192,453

RECTIFIER STACK

Filed Aug. 28, 1962 2 Sheets-Sheet 1

INVENTOR.
GEORGE H. POHM

BY John Howard Smith
ATTY.

June 29, 1965 G. H. POHM 3,192,453

RECTIFIER STACK

Filed Aug. 28, 1962 2 Sheets-Sheet 2

INVENTOR.
GEORGE H. POHM

BY John Howard Smith
ATTY.

United States Patent Office 3,192,453
Patented June 29, 1965

3,192,453
RECTIFIER STACK
George H. Pohm, Lorain, Ohio, assignor to Lorain Products Corporation, a corporation of Ohio
Filed Aug. 28, 1962, Ser. No. 220,002
1 Claim. (Cl. 317—234)

Figure 1:
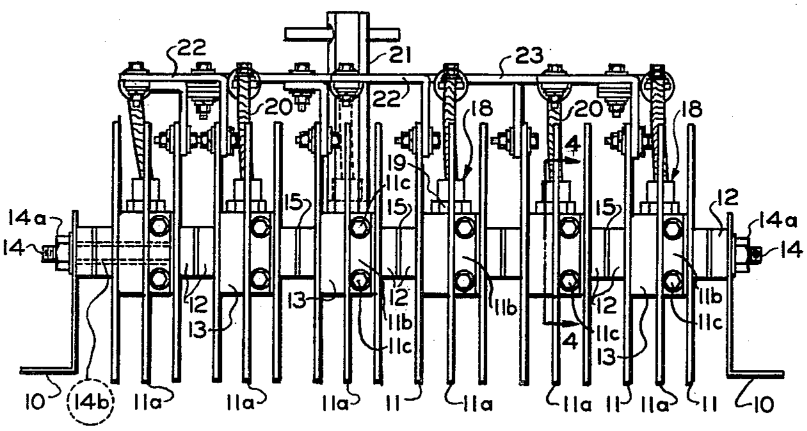

This invention relates to improved rectifier stacks and is directed more particularly to a stack adapted to utilize silicon diodes or other devices of the type which generate heat during normal operation.

An important consideration in the use of electrical elements such as silicon diodes in rectifier stacks and the like, is the provision of an adequate cooling arrangement whereby, during operation of the electrical apparatus in which the element is installed, the temperatures attained in the element itself and in the surrounding area of the machine will be maintained within a range whereby temperatures detrimental to the element will not be reached.

Such a structure may include a somewhat massive volum of heat conducting material such as copper or aluminum in the immediate vicinity of the electrical element and additionally, fin-like structures disposed in heat conducting relationship to the massive volume and in mounting relationship thereto whereby the element and the mass is cooled by conduction.

In the past, in order to provide efficient cooling in a structure of the character described above it has been the practice to dispose the silicon diodes, which themselves are provided with a predetermined mass of heat conducting material, between heat conducting fins along an axis which is normal to the plane of those fins.

In the operation of rectifier stacks which include a plurality of unidirectional devices such as silicon diodes, it is unusual for all of the diodes to fail at the same time. Rather, individual diodes, due to inherent characteristics thereof, will fail. When this occurs, the entire stack, of course, is rendered inoperative for the purposes intended and the operation of the apparatus with which the diode is associated is thus detrimentally affected. This situation is corrected by replacing the diode which has failed and in prior structures, since the diodes are aligned on a clamping axis normal to the plane of the fins, it is necessary to disassemble the stack progressively from one side or the other until the inactive diode is reached whereupon it can be replaced. This operation is time consuming and costly.

Accordingly, it is an important object of the invention to provide an improved stack structure having improved heat transfer characteristics for the purpose of protecting the individual diodes and wherein an individual diode may be removed without distrubing any other parts of the overall structure of the stack.

Another important object of the invention is to provide an improved rectifier stack assembly which provides a high order of heat transfer from the diodes themselves.

Still another object of the invention is to provide a rectifier stack assembly which includes a novel arrangement of heat conducting, sink material so configurated and arranged as to receive, in heat conducting relation, a greater portion of the heat transfer material of the diode itself than has been the case heretofore.

It is a further object of the invention to provide a rectifier stack construction in which clamping pressure of a high order may be applied to stack components such as cooling fins, spacers and heat conducting blocks without subjecting the diode elements themselves to these high clamping pressures.

Another object of the invention is to provide a rectifier stack, modular in character, wherein the mounting elements for the stack, a clamping mechanism and heat conducting elements are all structurally associated in unit arrangement in a simple, economical and efficient manner to avoid the need for expensive extrusions or other integral structures.

Another object of the invention is to provide an improved rectifier stack which may be built up from standard parts capable of being cheaply manufactured and which afford a modular stack unit. This enables the same parts to be used in constructing stacks of different electrical design, for example, two, six or twelve cell stack arrangements. Furthermore, these standard parts may be used to obtain an increase in the magnitude of the cooling mass if this is found desirable and necessary in certain applications. This increases the cooling effect being obtained by the addition of cooling sections as required.

Figure 2:
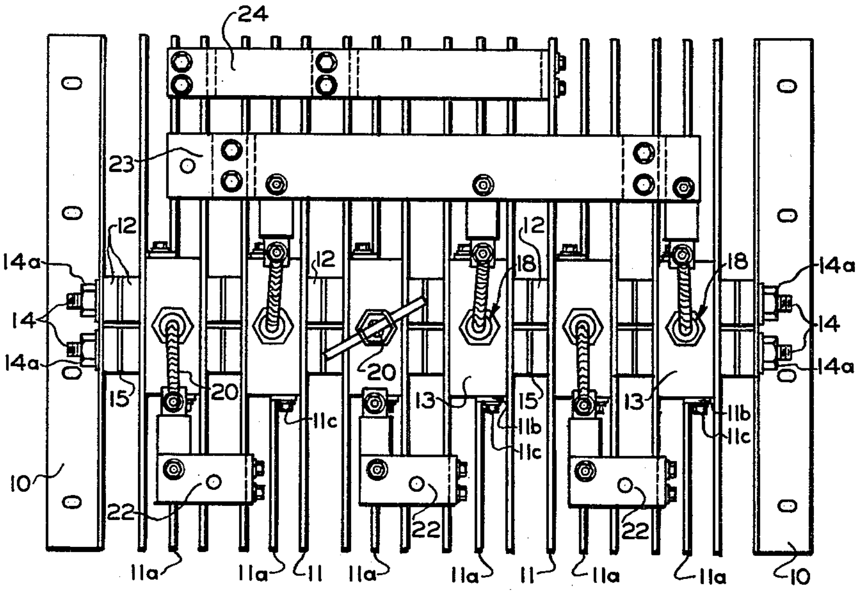
Figure 3:
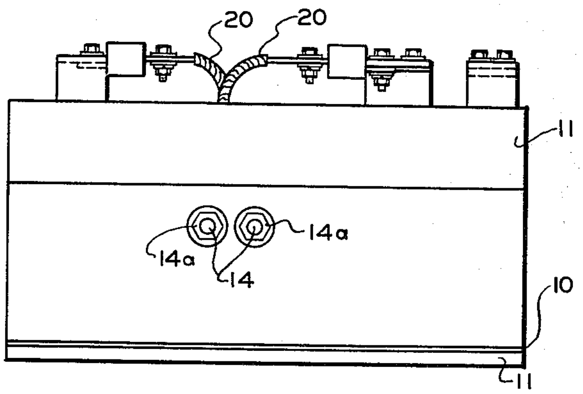
Figure 4:
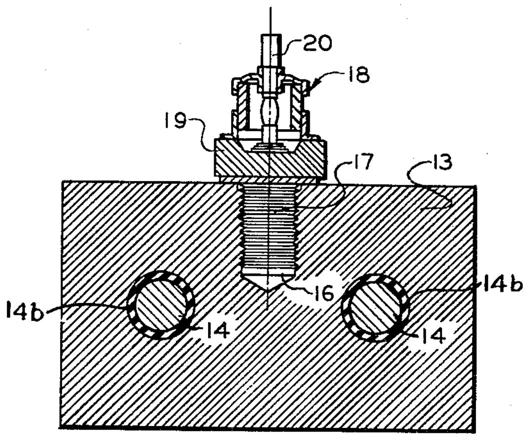

Other objects and advantages of the invention will become apparent from the following description and accompanying drawings in which:

FIG. 1 is a side elevation of the stack constructed in accordance with the invention, FIG. 2 is a top view of the structure shown in FIG. 1, FIG. 3 is an end view of the structure shown in FIG. 1 and FIG. 4 is a cross section taken on the line 4—4 of FIG. 1.

As will be seen from the drawings, a rectifier stack representing an embodiment of the invention includes mounting brackets 10, cooling fins 11 and **11*a* and spacer members 12**, all constructed from a material such as copper or aluminum having efficient conducting characteristics.

Additionally, certain of the spacers between the cooling fins take the form of conducting blocks 13 which, as will be explained presently, serve as a substantial heat conducting mass and also receive the diodes for individual removal from the assembly.

The mounting brackets 10, fins 11 and **11*a*, spacers 12 and blocks 13 are all suitably drilled with apertures to receive clamping rods 14. The ends of the rods are threaded as shown in FIGS. 1 and 2 and receive the suitable nuts 14*a***, by means of which the assembly is clamped tightly with the parts in alignment to provide a rugged, unitary assembly.

To the end that the individual diode assemblies may be electrically isolated from one another to permit satisfactory electrical connections, the usual ceramic or insulating sleeve shown at **14*b*, is provided over the clamping rods 14. Additionally, companion spacers 12 are separated by ceramic insulating wafers 15. Accordingly it will be seen that an individual diode assembly, a plurality of which are used to make up a complete stack, includes a conducting block 13, a central fin 11*a*, side fins 11 and spacer blocks 12 located adjacent the outer surface of the respective side fins 11, the spacer blocks 12, as described previously, being provided with insulating wafers 15** between them.

As will be seen from FIGS. 1 and 2, cooling fins **11*a* are each provided along a portion of one edge with a flange 11*b* bent at right angles to the main portion of the fin. Each of the flanges 11*b* is apertured to receive bolts 11*c* by means of which they are secured in heat conducting, surface to surface relationship with blocks 13**.

As best shown in FIG. 4, each of the blocks 13 is tapped and drilled to form receptacles 16 which receive the externally threaded extension 17 of a silicon diode 18 or other heat generating device.

It will be understood that while a threaded connection between the block 13 and the diode 18 is shown herein, other mechanical connections involving a press fit attachment can be utilized so long as heat conducting surface to surface contact between the heat generating device and the block is satisfactorily obtained.

The structure of the diode 18 shown herein is completed by the provision of the body portion 19 in which the semiconductive materials are housed and a connection 20 referred to generally as a "pigtail."

As indicated previously, at the present state of the semiconductor art these devices are sensitive to temperature. Additionally they are subject to failure under the influence of high current peaks to which an electrical circuit is sometimes subjected. Under these circumstances, particularly since the inherent characteristics of the given group of semiconductor devices may vary, some of the units of the group will withstand certain conditions while others will fail under the same conditions. This being the case, it will be seen that in a rectifier stack of the type here shown, individual semiconductors may collapse and as this occurs replacement becomes necessary. In replacing a semiconductor, it is essential that this maintenance operation be conducted as rapidly and as economically as possible since with a disabled rectifier stack, the equipment in which it is incorporated is rendered inoperative and should, for instance, telephone circuitry be involved, telephone communications break down.

To the end that efficient dissipation of the heat generated by the semiconductor elements 18 may be realized and also to the end that individual semiconductor elements may be removed from the stack and replaced without disturbing any of the other components, the necessary clamping action between the cooling fins 11 and 11*a*, the spacers 12 and the conducting blocks 13 is accomplished without incorporating the semiconductor elements in the clamping axis.

After the fins 11 and 11*a*, the spacers 12 and the blocks 13 together with the mounting brackets 10 are assembled, as shown in FIGS 1 and 2, on the clamping rods 14, the nuts 14*a* are tightened toward one another. The resulting clamping action affords an efficient heat conducting engagement between adjacent surfaces of the above elements which make up the stack.

On the other hand, because of the engagement of the semiconductor diode elements 18 in the threaded receptacles 16 of conductor blocks 13, they are not affected or held in position by this clamping action but rather are independently secured in heat conducting relationship to the assembly. On the other hand, with the structure shown, each diode is individually removable from the respective threaded receptacle. It has been found that the threaded engagement between the portion 17 of the diode and the threaded receptacle 16 together with the engagement of the bottom surface of the body 19 of the diode with the adjacent surface of the block 13 provides efficient heat conducting contact whereby the total cooling effect of spacers, fins and the conducting block 13 is applied to each of the individual diodes.

Since the diodes 18 are individually removable from the respective conducting block, the maintenance operation is accomplished by disconnecting the outer end of the "pigtail" 20 from the equipment and placing a tubular hex wrench 21 over the hexagonal portion 19 of the diode body. With this arrangement, the diode may be easily and quickly removed and another inserted in the conducting block.

From the foregoing it will be seen that an efficient heat conducting connection may be established between the stack and the diode and yet the necessary clamping action for establishing an efficient heat conducting relationship between the rest of the elements in the stack is not impressed on the diodes. Thus it is unnecessary, as in the past, to replace the diode by means of removal of the nuts 14*a* and progressive removal of stack elements until the defective diode is reached.

It will be understood, of course, that in the design of rectifier stacks many and varied electrical connections may be provided to obtain the electrical circuit characteristics desired for the particular use to which the stack is to be applied. In the present instance, by way of example, alternating current input straps are provided at 22 while a negative D.-C. output strap is shown at 23 and a positive D.-C. output strap at 24. Since the particular electrical connections are no part of the present invention, details in this regard will be omitted.

Inasmuch as it is an accepted fact that the application of excessive torque on a semiconductor of the type here shown can cause premature failure of the element under operation, it will be seen that high clamping forces applied across the other elements of the stack as by turning nuts 14*a* may be applied without subjecting the diodes to these sources. Hence efficient heat conducting surface contact can be obtained between the cooling fins, the spacers and the contact blocks without detrimentally effecting the diodes.

What I claim is:

In a rectifier stack assembly of the class described, rectifier modules each comprising a heat conducting first spacer block having a receptacle adapted to removably receive a heat generating member, a plate-like fin positioned on each side of said block, a heat conducting second spacer positioned adjacent to each of said fins outwardly of said block, apertures in each of said block, fin and spacer means, apertured insulating means, insulated clamping rod means, a suitable number of said modules being assembled in clamped relationship with an apertured insulating means between each adjacent pair of modules by extending said insulated clamping rod means through said apertures, auxiliary fin means attached in heat conducting relationship to said first spacer block intermediate said plate-like fins, electrical terminal means attached to the fin means of certain of said modules for connection to A.-C. power, said electrical terminal means adapted to receive in electrically conducting relationship respective electrical leads of heat generating devices located in the remainder of said modules, first conducting means mounted on the rectifier stack and in electrically isolated relationship thereto for receiving in electrically conducting relationship the electrical leads of heat generating devices located in said certain of said modules to provide one pole of a D.-C. output, second conducting means commonly connecting at least one of said fin means of each of said remainder of modules to provide another pole of a D.-C. output.

References Cited by the Examiner

UNITED STATES PATENTS 2,986,679 5/61 Storsand ............ 317—234

JOHN W. HUCKERT, *Primary Examiner.*

JAMES D. KALLAM, DAVID J. GALVIN, *Examiners.*